(12) United States Patent
Hunter

(10) Patent No.: US 8,297,961 B2
(45) Date of Patent: Oct. 30, 2012

(54) CO-EXTRUDER HAVING A FILLING ENTRANCE FROM THE REAR

(75) Inventor: Thomas B. Hunter, Collinsville, IL (US)

(73) Assignee: Kerry, Inc., Beloit, WI (US)

( * ) Notice: Subject to any disclaimer, the term of this patent is extended or adjusted under 35 U.S.C. 154(b) by 648 days.

(21) Appl. No.: 12/425,032

(22) Filed: Apr. 16, 2009

(65) Prior Publication Data

US 2009/0280205 A1    Nov. 12, 2009

Related U.S. Application Data

(60) Provisional application No. 61/071,179, filed on Apr. 16, 2008.

(51) Int. Cl.
*B29C 47/06* (2006.01)
(52) U.S. Cl. .......... 425/133.1; 425/192 R; 425/311; 425/377; 425/462
(58) Field of Classification Search .......... 425/133.1, 425/192 R, 311, 377, 462
See application file for complete search history.

(56) References Cited

U.S. PATENT DOCUMENTS

| | | |
|---|---|---|
| 1,805,706 A | 5/1931 | Rausch |
| 2,982,231 A * | 5/1961 | Fries .................. 425/131.1 |
| 3,213,808 A | 10/1965 | Schafer |
| 3,452,687 A | 7/1969 | Kaneko et al. |
| 3,499,766 A | 3/1970 | Vollink et al. |
| 3,807,919 A | 4/1974 | Kaufman, Jr. et al. |
| 3,860,373 A | 1/1975 | Kaufman et al. |
| 4,015,518 A | 4/1977 | Roth et al. |
| 4,025,260 A | 5/1977 | Neel |
| 4,615,894 A | 10/1986 | Ruegg |
| 4,630,533 A | 12/1986 | Schaaf et al. |
| 4,793,786 A | 12/1988 | Greenhouse et al. |
| 4,851,247 A | 7/1989 | Greenhouse et al. |
| 4,900,572 A | 2/1990 | Repholz et al. |
| 5,062,782 A | 11/1991 | Tompkins et al. |
| 5,198,257 A | 3/1993 | Heck et al. |
| 5,770,241 A * | 6/1998 | Tuzzio et al. .................. 425/232 |
| 5,773,043 A | 6/1998 | Hunter |
| 6,511,309 B1 | 1/2003 | Hunter |
| 6,733,263 B2 | 5/2004 | Pope et al. |

(Continued)

FOREIGN PATENT DOCUMENTS

EP    1 157 613 A1    11/2001

*Primary Examiner* — Yogendra Gupta
*Assistant Examiner* — Joseph Leyson
(74) *Attorney, Agent, or Firm* — Birch, Stewart, Kolasch & Birch, LLP

(57) ABSTRACT

A cutter assembly for an extruder includes an elongated extrusion member having an open feed end. The open feed end is attachable in fluid communication with the extruder for supplying a mash to said elongated extrusion member. An extrusion die is supported on a front of the elongated extrusion member. The extrusion die includes an extrusion outlet formed therein. A filling tube is mounted on a rear of the elongated extrusion member and is attachable in fluid communication with the extruder for supplying a filling to the filling tube. A cutter member has a drivable end and a cutter blade with a cutting surface for cutting extrudate to a desired length as the extrudate exits the extrusion die. The cutter member is operably connectable at the drivable end to a drive device of the extruder for reciprocatably sliding the cutting surface of the cutter blade over and away from the outlet of the extrusion die.

8 Claims, 5 Drawing Sheets

U.S. PATENT DOCUMENTS

| | | |
|---|---|---|
| 6,866,878 B1 | 3/2005 | Battaglia |
| 6,964,562 B2 | 11/2005 | Hunter |
| 7,264,836 B2 | 9/2007 | McHugh et al. |
| 7,320,279 B2 | 1/2008 | Hunter |
| 2004/0216619 A1 | 11/2004 | Hunter |
| 2005/0084577 A1 | 4/2005 | Rothamel et al. |
| 2008/0241327 A1 | 10/2008 | Hunter |

* cited by examiner

CO-EXTRUDER HAVING A FILLING ENTRANCE FROM THE REAR

This Non-provisional application claims priority under 35 U.S.C. §119(e) on U.S. Provisional Application No. 61/071,179 filed on Apr. 16, 2008, the entire contents of the above application is hereby incorporated by reference into the present application.

BACKGROUND OF THE INVENTION

1. Field of the Invention

The present invention relates to a cutter assembly for an extruder for extruding filled food pieces. More particularly, the present invention relates to an extruder cutter assembly, which includes a filling tube that that enters through the rear of the cutter assembly.

2. Description of Background Art

Extruders for producing extruded food pieces are known. Such extruders can conventionally include a pressure vessel for containing, under pressure, a mash of the food to be extruded. Furthermore, pressure exerting means for maintaining pressure in the pressure vessel, a manifold in fluid communication with the pressure vessel, and a cutter assembly, generally located underneath the pressure vessel, in fluid communication with the manifold can be included. The extruder cutter assembly cuts the extruded food to size. An extruder of the above type is disclosed, for example in U.S. Pat. No. 5,773,043 to Hunter (hereinafter "the '043 Patent"). The '043 Patent is hereby incorporated by reference.

In the '043 Patent, an extruder cutter assembly extrudes a food piece in the shape of a natural food piece. The extruder cutter assembly includes an extrusion member and a tubular cutter member for cutting extrudate exiting the extrusion member. However, the '043 Patent does not include a filling tube that enters through a rear of the cutter assembly as in the present invention.

The present inventor has also invented an extruder cutter assembly for extruding foodstuff containing a filling. In U.S. Pat. Nos. 6,511,309 and 6,964,562 (hereinafter "the '309 Patent" and "the '562 Patent", respectively), an extruder cutter assembly includes a filling tube or passageway for extruding a filling along with the mash of food to form a filled food product. An extension is formed on the extrusion member and the cutter member to allow for the extrudate to exit the extruder cutter assembly from the side. This extension to the extrusion member and cutter member is similar to the present invention. However, the extruder cutter assembly in the '309 Patent and the '562 Patent does not include a filling tube that enters through the rear of the cutter assembly as in the present invention. The '309 Patent and the '562 Patent are hereby incorporated by reference.

SUMMARY OF THE INVENTION

It is an object of the present invention to provide cutter assembly for an extruder, which makes up for the above deficiencies of the background art. Specifically, it is an object of the present invention to provide an extruder cutter assembly, which includes a filling tube that enters the cutter assembly through the rear.

By providing the filling tube entering through the rear of the cutter assembly, the distance between the entrance of the filling tube and the outlet of the die assembly is much shorter than in the background art devices. In the background art devices, a 1½ inch inside diameter feed tube is used to feed the filling material to the filling tube. The filling tube is a ½ inch inside diameter tube that extends the entire vertical length of the cutter assembly. Therefore, the cutter assembly must operate at a higher pressure to force the filling material through the filling tube. In the present invention; however, although a 1½ inch inside diameter filling tube is used to feed the filling material to the filling tube, which is also a ½ inch inside diameter tube, for example, the distance that the filling material has to travel is much less than in the background art. In view of this, the pressure needed to feed the filling material is much less than that background art. In addition, if larger pressures are used, filling material having much higher particulate sizes can be fed through the filling tube than when compared with the background art devices.

With the cutter assembly according to the present invention, it is also possible to form products that are larger than in the prior art, mainly because the operating pressure can be obtained to feed the extrudate through the die. For example only, a product that is approximately ⅜ to ½ inches thick, but still filled in the middle can be formed with the present cutter assembly. As one example only, the present invention can be used to form a 12 mm thick mashed potato/omelet product having an 8 mm thick filling (omelet) and a 2 mm thick outer layer (potato). This product can also be formed 49 mm wide, for example.

According to the present invention, it is also possible to exchange the filling tube and the extrusion die portions of the cutter assembly very easily by simply unbolting the existing portions and substituting therefore a filling tube or extrusion portion having a different size and/or shape. In this way, it is possible to provide a variety of shapes, thicknesses and widths of a product and also very easily adapt the amount of filling to correspond to the particular product. The removal of the extrusion die and the filling tube also makes the extruder cutter assembly very easy to clean between processes to make sure that no contamination of a process occurs.

According to the present invention, an adjustable ramp can be provided to ensure that the product does not break when exiting the cutter assembly.

In order to accomplish the above objects of the present invention, A cutter assembly for an extruder, comprises:

an elongated extrusion member having an open feed end, said open feed end being attachable in fluid communication with the extruder for supplying a mash to said elongated extrusion member;

an extrusion die supported on a front of said elongated extrusion member, said extrusion die including an extrusion outlet formed therein;

a filling tube, said filling tube being mounted on a rear of said elongated extrusion member and being attachable in fluid communication with the extruder for supplying a filling to the filling tube; and a cutter member having a drivable end and a cutter blade with a cutting surface for cutting extrudate to a desired length as the extrudate exits the extrusion die, said cutter member being operably connectable at the drivable end to a drive device of the extruder for reciprocatably sliding the cutting surface of the cutter blade over and away from the outlet of the extrusion die.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
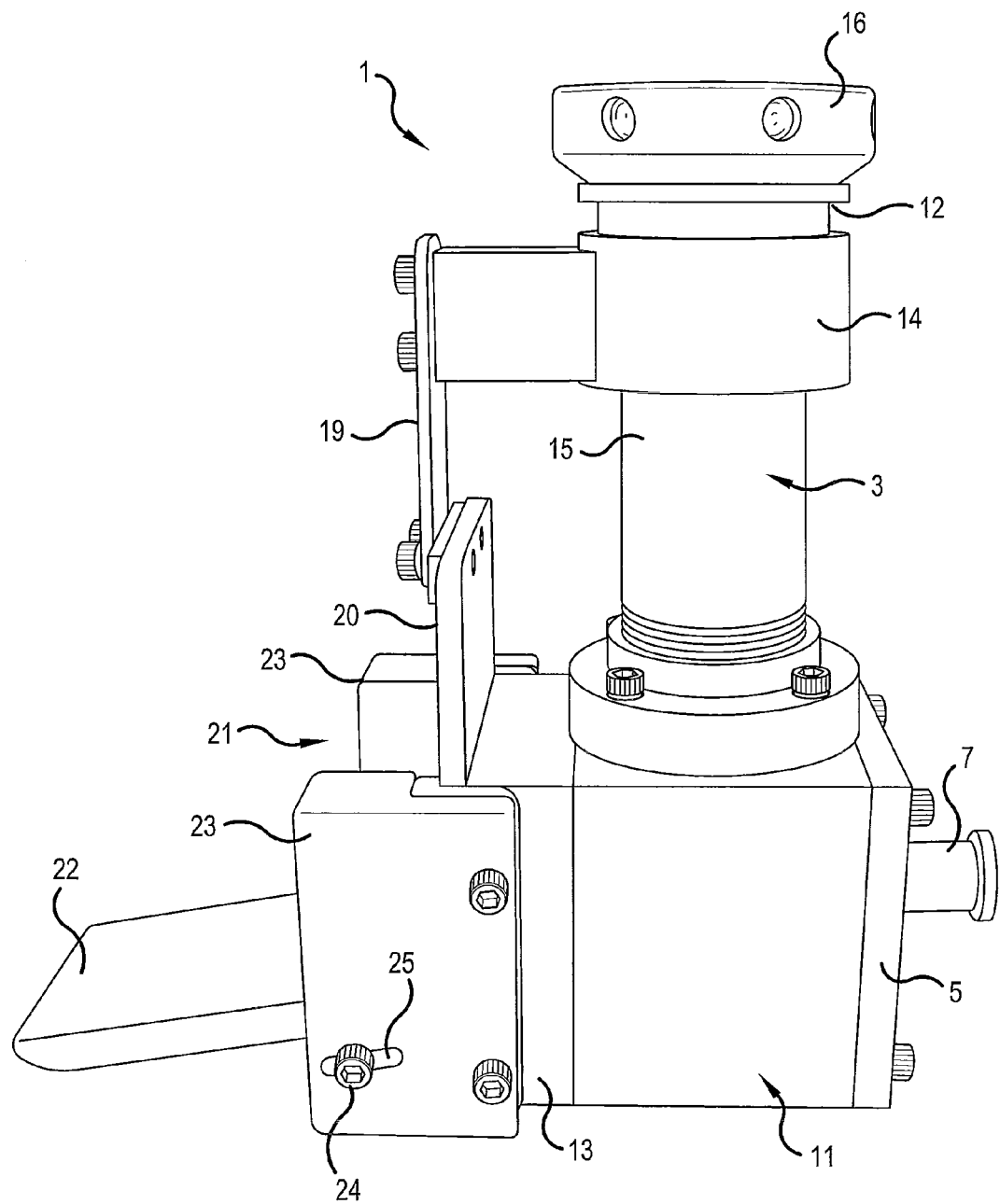
FIG. 1 is a perspective view of the extruder cutter assembly of the present invention.

The present invention will now be described with reference to the accompanying drawings, wherein the same or similar elements are identified by the same reference numerals throughout the several views.

The extruder cutter assembly 1 of the present invention is used to extrude a filled food piece and operates in generally the same manner as the '309 Patent and the '562 Patent mentioned above. However, rather than having the filling tube extending parallel to the elongated extrusion member, the filling tube enters the elongated extrusion member from the rear. Specifically, referring to FIG. 1, the elongated extrusion member 3 includes a plate 5 that is bolted to the right side of the elongated extrusion member 3. The plate 5 includes the filling tube 7 that extends through the plate 5 and into the elongated extrusion member 3. The filling tube 7 is integrally connected to the plate 5 by, for example, welding; however, it is conceivable that the filling tube 7 be attached in another manner as well. As long as the filling tube 7 can be sealed to the plate 5 to prevent leakage of the extrudate, then such attachment would be sufficient. Further to this, an o-ring 9 is mounted to the plate 5 to seal between the plate 5 and a generally block-shaped extrusion portion 11 of the elongated extrusion member 3.

The filling tube 7 has a first end 8 that is attachable to an extruder that provides filling to the extruder cutter assembly. A second end 10 of the filling tube 7 forms an exit of the filling tube 7.

On the left side of the extrusion portion 11, an extrusion die 13 is bolted thereto. An annular portion 15 of the elongated extrusion member 3, which includes the mash therein, and the filling tube 7, which includes the filling therein, are in communication with the outlet 17 of the extrusion die 13. As the food product exits the extrusion die 13, the food product is cut to a predetermined length by the cutter member 19.

The cutter member 19 is reciprocable between a first, raised position (see FIGS. 1-3) and a second, lowered position (see FIG. 4), so that the extrudate is cut as it is exiting the extrusion die 13. Specifically, a driving mechanism (not shown) is received in a slot 12 of a collar 14 that is slidably mounted on an outer surface of the annular portion 15 of the elongated extrusion member 3. The cutter member 19 is bolted to the collar 14 and includes a replaceable cutter blade 20 attached to an end thereof. The speed of the reciprocation of the cutter member 19 is set to the speed of the extrusion of the extrudate, depending on the particular application, in order to adjust the length of the finished food product.

The annular portion of the elongated extrusion member 3 is connectable at a top 16 thereof to an extruder that includes a source of mash. The mash surrounds the filling material to be located on an outside of the filling material at the outlet 17 of the extrusion die 13.

The extrusion die 1 includes a ramp (sled) member 21 removably attached to a left side thereof. The ramp member 21 includes an adjustable sloped portion 22 that is pivotably mounted thereto. The sloped portion 22 is also adjustable to change the height of the pivot point by sliding the pin 24 up and down an adjustment slot 25. The ramp member 21 also includes two side walls 23 that prevent the food product from falling off of the ramp member 21 sideways.

The sloped portion 22 is adjustable in order to change the incline amount thereof, depending on the application. If the incline of the sloped portion 22 is too high, bending of the food product exiting the extrusion die 13 can occur. If the incline is not high enough, smooth flow of the food product exiting the extrusion die 13 does not occur.

Figure 2:
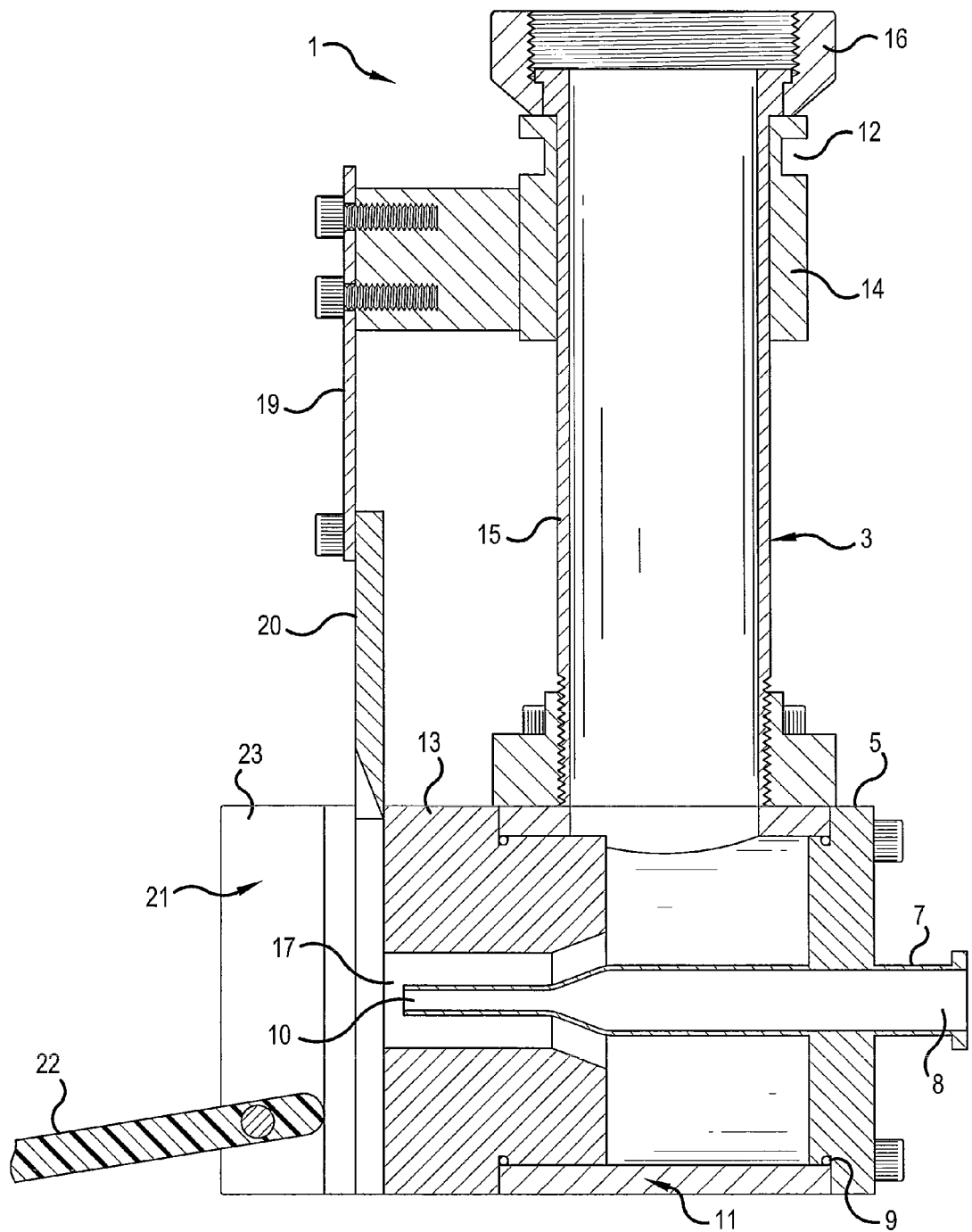
FIG. 2 is a cross-section of the extruder cutter assembly of the present invention.
Figure 3:
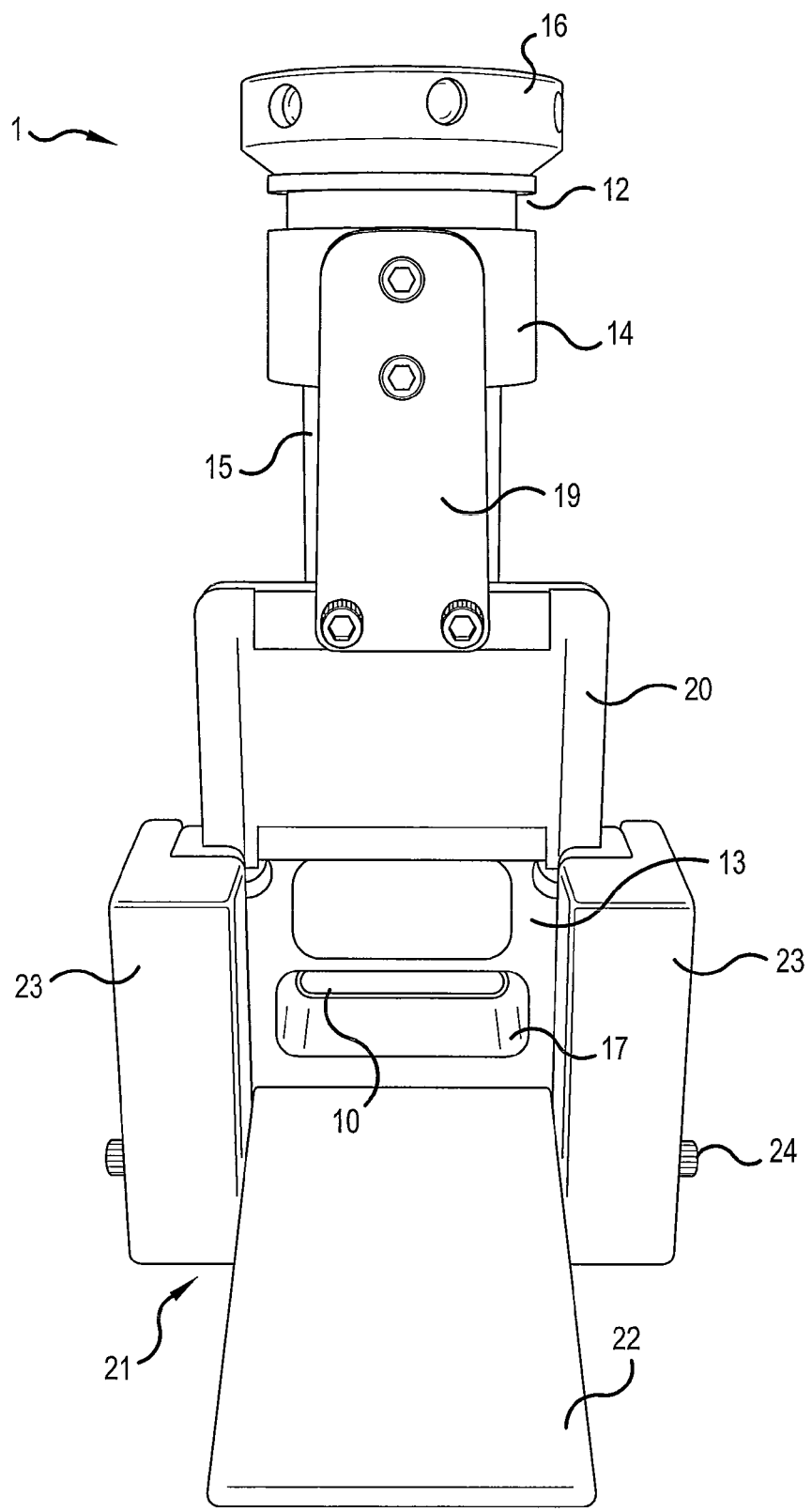
FIG. 3 is a left perspective view of the extruder cutter assembly of the present invention, wherein the cutter member is in the raised position.

As can be understood from the cross-section in FIG. 2, the pin 24 is a single pin that extends completely through the sloped portion 22; however, the pin 24 could be two separate pins, one on each side of the sloped portion 22. As long as the sloped portion 22 is pivotably mounted to the ramp member 21, so that the ramp member can be adjusted by moving the pin 24 up and down the adjustment slot 25, it would be within the scope of the present invention.

The end of the sloped portion 22 of the ramp member 21 is operably placed in association with an adjustable conveyor (not shown). The conveyor would be set to the speed of the extruder cutter assembly 1, so that a smooth and continuous process of making a food product occurs.

Figure 4:
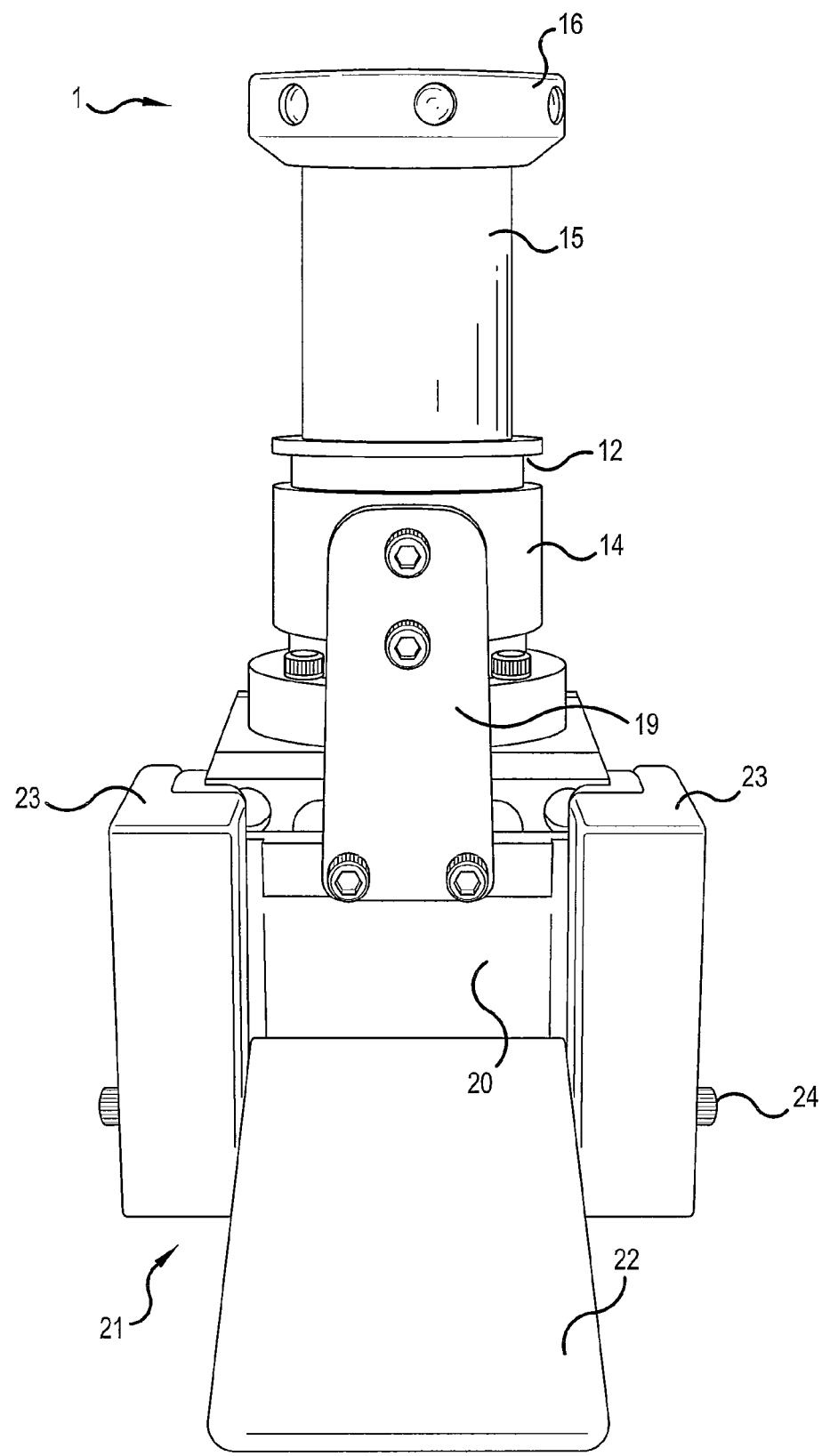
FIG. 4 is a left perspective view of the extruder cutter assembly of the present invention, wherein the cutter member is in the lowered position.

In addition, as can be seen in FIG. 4, the cutter blade 20 is downwardly movable into a gap formed between the sloped portion 22 of the ramp member 21 and the outlet 17 of the extrusion die 13 to make sure that the extrudate is completely cut by the cutting blade 20 during operation.

It should be understood that the filling tube 7 can be easily replaced with a filling tube 7 having a different shape, depending on the application. Also, the extrusion die 13 can be replaced to have a shape that corresponds to the shape of the filling tube 7 outlet. For example, referring to FIG. 3, the outlet of the filling tube 7 and the outlet 17 of the extrusion die 13 are generally rectangular in shape. However, the shapes of the filling tube 7 and the extrusion die 13 can be of various other shapes, depending on the application. For example, the extrusion die 13 and the filling tube 7 can have an oval shape, a round shape, etc.

Figure 5:
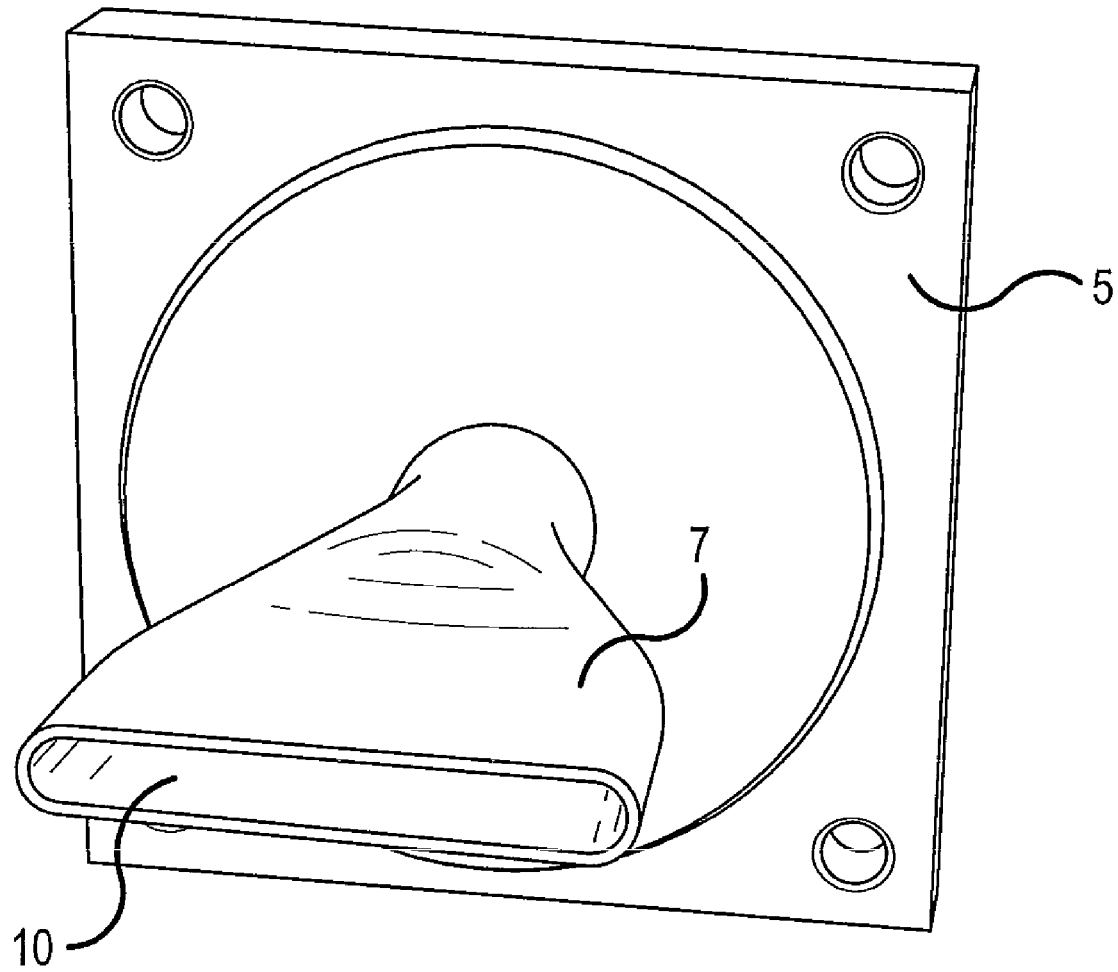
FIG. 5 is a perspective view of the filling tube member of the present invention.

FIG. 5 is a perspective view of the filling tube 7 and plate 5, which are preferably formed as a single, integral unit. The filling tube can be easily replaced by unbolting the plate 5 from the extrusion portion 11, so that the amount of filling can be adjusted very easily to a particular extrusion die 13 outlet 17. As mentioned above, the size and shape of the outlet 10 can be changed to correspond with a particular extrusion die 17. In addition, the length of the filling tube 7 itself can be adjusted as well as the length that the extrusion die extends into the extrusion portion 11 in order to control the exiting of the extrudate and make sure that is comes out straight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cutter assembly for an extruder, comprising:
   an elongated extrusion member having an open feed end, said open feed end being attachable in fluid communication with the extruder for supplying a mash to said elongated extrusion member, the elongated extrusion member including an annular portion forming an extrusion passage for the mash, and a generally block-shaped extrusion portion removably mounted to an end thereof;
   an extrusion die including an extrusion outlet formed therein, said extrusion die being removably mounted to a front surface of said generally block-shaped extrusion portion;
   a filling tube attachable in fluid communication with the extruder for supplying a filling to the filling tube, said filling tube being removably mounted to a rear, opposed surface of said generally block-shaped extrusion portion; and
   a cutter member having a drivable end and a cutter blade with a cutting surface for cutting extrudate to a desired length as the extrudate exits the extrusion die, said drivable end including a collar reciprocably mounted on the annular portion of the elongated extrusion member, said cutter member being operably connectable at the drivable end to a drive device of the extruder for reciprocatably sliding the cutting surface of the cutter blade over and away from the outlet of the extrusion die.

2. The cutter assembly for an extruder according to claim 1, wherein a passage formed by the elongated extrusion member has a generally vertical longitudinal axis and a passage formed by the filling tube has a generally horizontal longitudinal axis that is perpendicular thereto.

3. The cutter assembly for an extruder according to claim 1, further comprising an adjustable ramp member attached to the extrusion die at the outlet thereof, said adjustable ramp member including a sloped portion that is adjustable to change an inclination angle of thereof.

4. The cutter assembly for an extruder according to claim 1, wherein the filling tube is replaceable with a plurality of replacement filling tubes of different shapes and sizes and the extrusion die is replaceable with a plurality of replacement extrusion die of different shapes and sizes, so as to control the size and shape of the extrudate and thereby form a plurality of different food products.

5. The cutter assembly for an extruder according to claim 1, wherein the filling tube includes an integral plate that is removably mounted to the rear of the generally block-shaped extrusion portion, the filling tube extending unsupported from the plate to adjacent the extrusion outlet of the extrusion die.

6. The cutter assembly for an extruder according to claim 1, wherein a length of the filling tube is adjustable, as well as a length that the extrusion die extends into the generally block-shaped extrusion portion, in order to control the exiting of the extrudate.

7. The cutter assembly for an extruder according to claim 1, wherein an outlet of the extrusion die has substantially the same shape as an outlet of the filling tube.

8. The cutter assembly for an extruder according to claim 1, wherein the extrusion die has an outlet, the annular portion of the elongated extrusion member and the filling tube are in communication with the outlet so that the mash surrounds the filling material to be located on an outside of the filling tube at the outlet of the extrusion die.

* * * * *